United States Patent
Hostettler

[15] 3,666,724
[45] May 30, 1972

[54] EQUILIBRATED POLYESTERS AND POLYURETHANES BASED THEREON

[72] Inventor: Fritz Hostettler, Verona, N.J.

[73] Assignee: Inter-Polymer Corporation, Passaic, N.J.

[22] Filed: Aug. 13, 1970

[21] Appl. No.: 63,635

Related U.S. Application Data

[63] Continuation of Ser. No. 761,790, Sept. 23, 1968, abandoned.

[52] U.S. Cl..................260/75 NK, 260/2.5 AN, 260/75 M, 260/77.5 AN
[51] Int. Cl.........................................................C08g 22/10
[58] Field of Search..............260/75 NK, 2.5 AN, 860, 863, 260/75 M

[56] References Cited

UNITED STATES PATENTS

| | | | |
|---|---|---|---|
| 2,691,006 | 10/1954 | Flory | 260/45.4 |
| 3,000,849 | 9/1961 | Clachan et al. | 260/45.4 |
| 2,929,800 | 3/1960 | Hill | 260/77.5 |
| 3,248,373 | 4/1966 | Barringer | 260/77.5 |

*Primary Examiner*—Donald E. Czaja
*Assistant Examiner*—H. S. Cockeram
*Attorney*—Edmond, Pennie, Morton, Taylor and Adams

[57] ABSTRACT

Copolyesterpolyols comprising the equilibration product of at least two polyols manufactured by heating at least two high molecular weight polyols, at least one of which is a polyester polyol, to a temperature of 150° to about 300° C., preferably in the presence of a polyesterification and/or ester interchange catalyst, for a sufficient period of time to produce new copolyesterpolyols which have substantially constant melting points. Such copolyesterpolyols have approximately the melting point as the combination of the ingredients synthesized by a normal copolyesterification technique. Also provided are polyurethane products derived from the copolyesterpolyols comprising solid urethane elastomers, microcellular elastomers, flexible and rigid polyurethane foams, injection-molding resins, prepolymers and the like, prepared by reaction of the copolyesterpolyols with an organic polyisocyante and a chain extender.

11 Claims, No Drawings

EQUILIBRATED POLYESTERS AND POLYURETHANES BASED THEREON

This application is a continuation of application Ser. No. 761,790, filed Sept. 23, 1968, now abandoned.

BACKGROUND OF THE INVENTION

1. Field of the Invention

The invention relates to a process for the manufacture of copolyesterpolyols comprising equlibrating a mixture of at least two high molecular weight polyols, at least one of which is a polyester polyol, at a temperature of 150° to 300° C., preferably in the presence of a catalyst for a sufficient period of time to produce a constant melting point for the resulting new equilibrated combination of said ingredients and to new polyurethane products prepared from the copolyesterpolyols.

2. Description of the Prior Art

It is well known in the prior art that high molecular weight copolyesterpolyols suitable for the manufacture of a large variety of polyurethane products, such as solid elastomers, injection-molding resins, rigid and flexible foams, coatings, adhesives, and the like, can be prepared by copolymerization of one or more dicarboxylic acids, one or more glycols, hydroxy acids or their corresponding lactones, and the like. It is also well known that in many cases copolyesterpolyols are highly preferable as compared with polyester polyols prepared from only one dicarboxylic acid and and one glycol, or from only one lactone such as epsilon-caprolactone and a glycol.

It has also been suggested in the prior art, as is indeed practiced commercially, to manufacture polyurethanes from blends of at least two high molecular weight polyols in order to obtain products possessing superior properties in certain respects. However, blends of such polyols oftentimes do not result in equivalent polyurethane products when compared with those produced by a true copolymerization of the ingredients present in the blend as mentioned above.

The preparation of true copolymers of the different compositions required for the manufacture of various polyurethanes can be time-consuming, and requires expensive inventory, tankage, etc. Moreover, the manufacture of such copolyesters from the original ingredients requires relatively elaborate and expensive processing equipment which, generally speaking, is only feasible for a relatively large manufacturer.

Consequently, there remains in the art a need for a processing technique which will result in the desired copolyesterpolyols without the need for elaborate inventories, extensive physical plant investment, and the like. Moreover, there remains a definite need for a simple process for the manufacture of said copolyesterpolyols, in particular for many tailor-made varieties, which can be made inexpensively by the relatively small manufacturer.

The present invention provides a simple method for the manufacture of such copolyesterpolyols from conventional commercially available polyesters, and further describes means for providing a much broader copolyesterpolyol product base from a limited number of polyester starting materials which may be already available on the market or which may be prepared for this specific purpose if desired. The invention further describes the various polyurethane products derived from the copolyesterpolyols manufactured in accordance with the processes set forth in this invention.

SUMMARY OF THE INVENTION

It is accordingly one object of the present invention to provide a simple process for the manufacture of copolyesterpolyols comprising equilibration of at least two polyols by subjecting at least two high molecular weight polyols, at least one of which is a high molecular weight polyesterpolyol, to a temperature of about 150° to 300° C., preferably in the presence of a polyesterification and/or ester interchange catalyst, for a sufficient period of time to produce an equlibrated copolyesterpolyol having approximately the melting point observed for the copolyesterpolyol containing said ingredients and manufactured by the conventional polyesterification technique where the original ingredients are all reacted simultaneously.

A further object of the present invention is to provide processes for the manufacture of polyurethane derivatives from the copolyesterpolyols made in accordance with the present invention.

A still further object of the present invention is to provide processes for the manufacture of various intermediates from the copolyesterpolyols made in accordance with the present invention.

Other objects and advantages of the present invention will become apparent as the description thereof proceeds.

In satisfaction of the foregoing objects and advantages of the present invention, there is provided a process for the manufacture of equilibrated copolyesterpolyols comprising reacting at least two high molecular weight polyols, at least one of which is a high molecular weight polyester polyol, at a temperature of about 150° to 300° C., preferably in the presence of a catalyst, for a period of time sufficient to produce an equilibrated copolyesterpolyol having approximately the melting point observed in a copolyesterpolyol containing the original ingredients which have been reacted simultaneously in the conventional procedure for preparing copolyesterpolyols.

Also provided are polyurethane products prepared by reacting the above-described copolyesterpolyols with an organic polyisocyanate and chain-extenders.

DESCRIPTION OF THE PREFERRED EMBODIMENTS

In accordance with the first embodiment of the present invention which provides a process for the manufacture of the equlibrated copolyesterpolyols, at least two high molecular weight polyols are reacted with one another, with the proviso that at least one of the two high molecular weight polyols is a polyesterpolyol, at a temperature from about 150° to 300° C., preferably in the presence of a catalyst, for a sufficient period of time to produce an equilibrated copolyesterpolyol having approximately the melting point observed for the copolyesterpolyol containing the original ingredients wherein all the original ingredients are reacted simultaneously as in the conventional technique for preparing copolyesterpolyols.

The high molecular weight polyols utilized for the manufacture of the equilibrated copolyesterpolyols are selected from the group consisting of linear and branched polyesters derived from dicarboxylic acids, hydroxycarboxylic acids or lactones, glycols, higher polyols such as triols, tetrols, and the like, and linear and branched polyethers derived from 1,2-alkylene oxides, tetrahydrofurane, and the like, with the proviso that at least one of the above high molecular weight polyols is a linear or branched polyester.

The linear and branched polyesters may be prepared by processes which are all well known in the prior art. The polyesterpolyols are normally manufactured by polyesterification of polycarboxylic acids, hydroxycarboxylic acids or lactones with glycols or higher polyols generally in the presence of a catalyst and the like. Among the polycarboxylic acids which deserve particular mention are succinic acid and glutaric acid or their anhydrides, adipic acid, pimelic acid, azelaic acid, sebacic acid, phthalic anhydride, isophthalic and terephthalic acids, chlorendic acid and its anhydride, tetrahydrophthalic anhydride, and the like. Among the glycols and higher polyols which deserve particular mention are alkanediols $HO(CH_2)_nOH$, wherein $n$ equals 2–10, like ethylene glycol, 1,4-butanediol, 1,6-hexanediol and the like, diethylene glycol, propylene and dipropylene glycol, 1,3-butyleneglycol, neopentylene glycol, lower molecular weight polypropylene glycols, glycerol, trimethylolpropane, 1,2,6-hexanetriol, pentaerythritol, α-methylglucoside, sorbitol, and the like.

These polyesters may be prepared by reacting the desired carboxylic acid with one or more glycols in the presence or absence of a catalyst such as the alkyl titanates, stannous acylates, lead acylates, and the like, all of which are known in the art, at a temperature of about 100° to 300° C. by known methods. The reactions may be utilized in any desired ratio as is well known.

The linear or branched polyesters derived from epsilon-caprolactones and other comonomers are adequately described in U.S. Pat. No. 3,169,945 and generally comprises reaction of one or more lactones with one or more glycols under the conditions mentioned above.

It should further be pointed out that the above linear or branched polyesterpolyols may also be copolymers of the various starting materials by themselves, which are prepared by methods known in the art.

The linear or branched polyesters which may be used as starting materials in conjunction with at least one of the above linear and branched polyesterpolyols, are well known in the art. The polyesters are preferably 1,2-alkylene oxide polyethers which are normally reaction products of glycols, triols or higher polyols with propylene oxide or combinations of propylene oxide and ethylene oxide to yield homopolymers, copolymers or block copolymers as desired. The derivatives of tetrahydrofurane are normally linear polymers obtained by direct polymerization of the monomer with Lewis acids followed by conversion of the end-groups to hydroxyl groups by treatment with base. All these processes are well known in the prior art.

Many of the above-described linear and branched polyester and polyether polyols are available as commercial products and are admirably suited for the processes of the present invention as will be further described hereinafter.

The molecular weight of the above linear and branched polyols may vary from as low as about 500 or lower to as high as about 5,000 or higher. Within this range, a molecular weight of from about 750 to about 3,500 is preferred. As stated previously, the polyol components may be linear or they may be branched to a varying degree. For example, if the resulting copolyesterpolyols are to be utilized for the manufacture of rigid foams, they should possess a relatively high degree of branching. If they are to be converted to flexible foams, they should possess a low degree of branching and if they are to be converted to elastomers and microcellular elastomers, they should preferably be essentially linear. As implied by the name, the linear and branched polyols are predominantly terminated by means of hydroxyl end-groups, although they may also contain carboxyl end groups. It is preferable, however, to limit the carboxyl number of such products to an upper limit of about 5, ans still more highly preferable to limit it to an upper value of about 2. Within the above-described molecular weight range, the hydroxyl equivalent weight may vary from 150 to about 1,500, and preferably from about 170 to about 1,200.

In the manufacture of the equilibrated copolyesterpolyols prepared in accordance with the present invention, at least two of the above-defined high molecular weight polyols, at least one of which is a polyesterpolyol, are heated to a temperature of about 150° C. to about 300° C. until the melting point of the resulting copolyesterpolyol arrives at a constant low value. Within the above range of temperature reaction, a temperature of from 180° C. to about 260° C. is preferred. In this connection, it has been observed that the melting point of the blend of the two high molecular weight polyols is invariably higher than the melting point of the resulting equilibrated copolyesterpolyol.

Reaction times depend upon the reaction temperature, amount and nature of catalyst if present, and other variables. Generally speaking, a reaction time of from several hours to about 36 hours is sufficient to effect proper equilibration. In order to protect the polyester materials from the action of oxygen, it is best to perform the reaction in an inert atmosphere such as nitrogen, methane, or other known gases which are inert to the reaction.

In the absence of a catalyst, the above reaction is very slow and may require many days to complete even when a high reaction temperature is utilized. However, the equilibration reaction can be accelerated appreciably by use of a polyesterification and/or ester interchange catalyst. Catalysts of this type which are particularly useful for the purpose of conducting the present process include tetraalkyl titanates such as tetraisopropyl and tetrabutyl titanate, stannous acylates such as stannous octoate, dialkyltin compounds and other organometallic tin compounds such as dibutyltin di-2-ethylhexoate and the like, lead compounds such as lead octoate and the like, zinc compounds, antimony compounds, mercury compounds such as phenyl mercuric acylates, mercuric oxide, and the like, acidic materials such as hydrogen chloride, boron trifluoride, trifluoroacetic acid, phosphorous pentafluoride, and the like. The catalysts are preferably employed in concentrations of 5 parts per million or lower, based upon the total reactants charged, to 0.3 percent by weight, or higher. If the materials are utilized to make prepolymer intermediates or cast elastomers, for example, it is highly desirable to utilize a very low catalyst concentration in cases where the catalyst residue is also a catalyst for the subsequent hydroxyl-isocyanate reaction.

The resulting equlibrated copolyesterpolyols, as mentioned above, are characterized by melting points which generally correspond to copolyesterpolyols, prepared by initially reacting the polycarboxylic acids, glycols, lactones, triols, etc. by procedures known to the art. However, the products produced by the process of this invention are more suitable for the preparation of urethanes than is a mere blend of the polyols. Therefore, the copolyesterpolyols of the invention are advantageous in that they provide a source of intermediates for the production of urethanes having a wide variety of properties without the time-consuming and expensive procedure of preparing the copolyester-polyols from the basic reactants. This is true because the starting polyols are readily available commercially.

In accordance with the second embodiment of the invention which provides a process for the manufacture of polyurethanes from the equilibrated copolyesterpolyols of the present invention, said equilibrated copolyesterpolyols (a) are reacted with organic polyisocyanates (b), and chain-extenders (c) comprising water, glycols, amino alcohols and diamines.

The organic polyisocyanates which are suitable in practicing the second embodiment of the invention which consists of the manufacture of rigid and flexible polyurethane foams, solid and microcellular urethane elastomers, injection-molding resins, and the like are generally those listed by Siefken, Annalen 562, page 75, (1949). In addition, diisocyanates and polymeric isocyanates described in U.S. Pat. Nos. 3,012,008 and 2,683,730 are also eminently suitable for the purposes of the present invention.

Among the organic polyisocyanates which are particularly suitable for the purpose of practicing the present invention are 2,4- and 2,6-toluene diisocyanates, 4,4'-diphenylmethane diisocyanate, 1,5-naphthalene diisocyanate, 4,4'-biphenylene diisocyanate, 3,3'-dimethyl-4,4'-biphenylene diisocyanate, m-xylylene diisocyanate, hexamethylene diisocyanate, and the like.

The equilibrated copolyesterpolyol products of the present invention may be reacted directly with the organic polyisocyanate and the chain-extender according to the so-called "one-shot" technique to produce foams, solid or microcellular elastomers, or injection-molding resins. Alternatively, these products may also be manufactured by means of the so-called "prepolymer" method comprising reacting the equilibrated copolyesterpolyol with an excess of the organic polyisocyanate to form the prepolymer, followed by subsequent reaction with the chain-extender(s) to produce the above-described products.

The chain-extenders which are useful in the manufacture of the above-described urethane articles include water in case of the manufacture of foams, glycols such as 1,4-butanediol, 1,6hexanediol, quinitol, bis-(2-hydroxyethyl)-hydroquinone, and the like, amino alcohols, and diamines such as 3,3'- dichloro-4,4'-biphenylenediamine, 4,4'-methylene-bis-(2-chloroaniline), and the like, in the case of the manufacture of solid elastomers such as cast elastomers or injection-molding resins. The use of the above organic polyisocyanates and chain-extenders is well understood from the prior art.

The reaction of the equilibrated copolyesterpolyols with the organic polyisocyanates and chain-extenders is generally performed at temperatures from about room temperature to about 200° C., or higher, with a convenient and preferred operation range from room temperature to about 150° C. The reactions may be accelerated by means of a catalyst, if desired. Such catalysts include, for example, tertiary amine catalysts, metallic catalysts of tin, lead, mercury, antimony, titanium, cobalt, iron, and the like, or combinations of tertiary amine catalysts with metallic catalyst. All these conditions, as well as the reactant ratios of the various ingredients and catalyst, surfactants if any, and the like, are well understood in the prior art.

The resulting polyurethanes are characterized by physical and chemical properties which are as good, and in some instances better, than properties of such urethanes manufactured using normal methods of preparing the polyester intermediates. As pointed out above, dependent on the method of preparation, urethane foams, solid and microcellular elastomers, urethane elastic fibers, urethane microporous elastomers, urethane coatings, and urethane injection resins may be prepared utilizing the copolyesterpolyols of this invention. All of these products have properties which compare favorably with those now known to the art.

In a still further embodiment of the present invention, the isocyanate-terminated prepolymers may be prepared by reacting the equilibrated copolyesterpolyols of the present invention with an excess of organic polyisocyanates. The prepolymers are prepared by reacting the desired equilibrated copolyesterpolyol with an excess of from about 0.2 equivalents of an organic polyisocyanate per equivalent of the equilibrated copolyesterpolyol to as high as 3–4 equivalents of the organic polyisocyanate per equivalent of said copolyesterpolyol at a temperature of from about room temperature to 200° C. or higher, preferably from about 50° C. to about 120° C. If desired, the reaction may be conducted in the presence of a catalyst by known methods.

The present invention is further exemplified by the following examples but is not to be considered as limited thereto.

In these examples, parts are by weight unless otherwise indicated.

EXAMPLE I

This example demonstrates the manufacture of a flexible polyester foam prepared from an equilibrated copolyesterpolyol of a commercially available polyester, "Fomrez"–50, and a branched adduct of trimethylolpropane and epsilon-caprolactone. The resulting foam exhibits considerably superior resistance toward the action of moisture as compared with the prior art polyester foams. This is due to the relatively high epsilon-oxycaproyl content of the equilibrated copolyesterpolyol.

Synthesis of Trimethylolpropane-epsilon-Caprolactone Adduct (Polyester A)

To a 3-liter Pyrex flask equipped with reflux condenser, agitator, heating mantle, nitrogen inlet, and thermometer, there were charged 118 grams of trimethylolpropane, 2509 grams of epsilon-caprolactone and 0.026 gram (10 parts per million) of stannous octoate catalyst. The reactants were heated to a temperature of 180°–190° C. under a slow stream of nitrogen for a period of 8 hours. The resulting polyester adduct, which solidified at about 45°–50° C., was shown by analysis to possess a hydroxyl number of 54.14 and an acid number of 1.05. The product melts too high and is too crystalline for the manufacture of suitable flexible foams. This polyester will be hereinafter designated as Polyester A.

"Fomrez"–50 Polyester

"Fomrez"–50 polyester was shown by analysis to be a copolyesterpolyol of adipic acid, diethylene glycol with a small amount of trimethylolpropane. It possessed a hydroxyl number of 54.0 and an acid number of 1.9.

Manufacture of Equilibrated Copolyesterpolyols

To a 1-liter Pyrex flask equipped as described above, there were charged 490 grams of Polyester A and 210 grams of "Fomrez"–50. The mixture was slightly hazy at 60°–70° C., indicating that it was not entirely compatible. The mixture was shown to have a melting point of 42°–43° C. The mixture was dehydrated by heating at 90° C. and 10 mm Hg to remove any moisture present and was then heated to 230°±5° C. in the presence of 20 parts per million, based on the original reactants, of tetraisopropyl titanate catalyst. The decrease in the melting point of the resulting equilibrating copolyesterpolyol was not followed. The following results were observed:

| Hours at 230 ± 5° C. | Melting point, °C. |
|---|---|
| 0 | 42–43 |
| 1 | 37–38 |
| 2.5 | 34 |
| 4.5 | 31 |
| 8.5 | 26–27 |
| 12.0 | 25–26 |

The temperature was then dropped to 180°–190° C. and the reactants were held for an additional 10 hours at this temperature, whereupon the melting point was found to be 22°–23° C. This melting point corresponds approximately to the melting point found when a true copolymer is prepared containing approximately the relative calculated segments derived by reacting epsilon-caprolactone, adipic acid, diethylene glycol and trimethylolpropane.

As can be seen from the above experiment, the equilibration reaction at the above catalyst level is relatively slow and requires high temperatures. At higher catalyst levels, which may or may not be desirable depending upon the intended end-use, the reaction is more rapid and can be conducted at lower temperature.

The above copolyesterpolyol, hereinafter designated as Polyester B, was shown by analysis to possess a hydroxyl number of 49.24, an acid number of 2.34, and a viscosity of 14,800 centipoises at 32° C. (Brookfield viscometer).

Manufacture of Flexible Polyester Foam

The above liquid copolyesterpolyol is admirably suited for the manufacture of flexible polyester foams as is shown hereinafter. For this purpose, 100 grams of Polyester B, 3.5 grams of water, 1.7 grams of N-ethylmorpholine, 0.4 grams of N-cocomorpholine, and 0.35 grams of L–531 polyoxyalkylene-polydimethylsiloxane copolymer surfactant were preblended in a waxed paper cup by means of an electric stirrer. To this premix, a total of 44 grams of 80:20 mixture of 2,4- and 2,6-toluene diisocyanate were added with rapid agitation. As soon as the mixture started foaming, it was transferred to a 1-gallon ice cream carton where it was allowed to foam. The resulting foam was cured for 4 hours at 100° C.

Examination of the foam revealed that it had a density of 2.3 lbs/cu. ft., possessed small very uniform cell structure and had high tensile and tear strength. The product compares very favorably with commercial foams prepared by the methods of the prior art.

Example II

This example demonstrates the manufacture of a linear equilibrated copolyesterpolyol suitable for the synthesis of solid and microcellular urethane elastomers, urethane elastic fibers, urethane microporous elastomers, urethane coatings, urethane injection-molding resins, and the like. For this purpose, two linear polyesters are equilibrated to a copolyesterpolyol.

Synthesis of Polyester C

To a 5-liter reaction flask equipped as described above there were charged 122 grams of ethylene glycol, 3,655 grams of epsilon-caprolactone, and 0.04 grams of stannous octoate catalyst. The materials were heated at 180°–190° C. for a period of 8 hours under a stream of nitrogen. The resulting polyester (Polyester C) had a melting point of about 60° C., an hydroxyl number of 56.74, and an acid number of 1.7.

Synthesis of Polyester D

To a 5-liter reaction flask equipped as above, there were charged 2,718 grams of adipic acid, 919 grams of 1,4-butanediol, and 658 grams of ethylene glycol. The reactants were heated up to 220° C. while 600 ml of water was removed. At this point, the acid number was observed to be 24. The reactants were further heated at 235°–240° C. at 2 mm Hg for a period of 10 hours to complete the polyesterification reaction. The resulting copolyester (Polyester D) was shown by analysis to possess an hydroxyl number of 54.18, and an acid number of 1.4. It melted at 24°–25° C.

Synthesis of Equilibrated Copolyesterdiol (Polyester E)

To a 1-liter reaction flask there were charged 490 grams of Polyester C and 210 grams of Polyester D. The mixture was found to have a melting point of 45°–46° C. and it crystallized readily at room temperature. The materials were now heated to 260 ± 5° C. in the presence of 10 parts per million, based upon the original ingredients, of stannous octoate catalyst. The decrease in melting point was measured as a function of the reaction time. The following results were observed:

| Hours at 260 ± 5° C. | Melting Point, °C. |
|---|---|
| 0 | 45–46 |
| 2 | 43–44 |
| 5 | 35–36 |
| 7 | 34–35 |

The materials were further heated for 12 hours at 175°–185° C. whereupon the product (Polyester E) was shown to have a melting point of 33°–34° C. A similar melting point is observed with a copolyester produced by the normal polyesterification technique wherein the reactants, epsilon-caprolactone, adipic acid, 1,4-butanediol, and ethylene glycol are charged in the ratios required to result in the approximate composition of Polyester E.

The above copolyesterdiol (Polyester E) was shown to possess an hydroxyl number of 47.0 and an acid number of 2.43. Evidently a small amount of glycol escaped with the nitrogen stream during the equilibration reaction.

Synthesis of Urethane Elastomer from Polyester E

A cast urethane elastomer was prepared from Polyester E by reacting 0.200 equivalents of the polyester with 0.639 equivalents of 4,4'-diphenylmethane diisocyanate and 0.418 equivalents of anhydrous, 1,4-butanediol.

To a 500 ml resin flask there were charged 0.200 equivalents of Polyester E, and the product was degassed and dehydrated at 90° C. and 1–2 mm Hg for 30 minutes. The solid diisocyanate was added at this temperature and after it dissolved, the reactants were upheated to 90° C. for 15 minutes. Upon application of a vacuum of 1–2 mm Hg, the resulting prepolymer was then heated to 120° C., the vacuum was broken, and the 1,4-butanediol was added with good agitation. The resulting exothermic reaction reached 140°–150° C. within about 2 minutes. During this time, the product was degassed by application of a vacuum of 1–2 mm Hg. The vacuum was not released and the materials were cast quickly into a 6 × 6 × 0.08 inch sample mold which had been preheated to 120° C. The mold was placed in a heated press and the sample was cured for 1 hour at 120° C., whereupon the mold was cooled and the sample was removed. The specimen was further cured in an oven at 100° C. for 16 hours. The cured elastomer exhibited the following physical characteristics:

| Property | Value | Test Method ASTM |
|---|---|---|
| Hardness, Shore A | 73 | D 1484–59 |
| Ultimate Tensile Strength, psi. | 3700 | D 412–61 T |
| Ultimate Elongation, % | 700 | D 412–61 T |
| 100% Tensile Modulus, psi. | 510 | D 412–61 T |
| 300% Tensile Modulus, psi. | 820 | D 412–61 T |
| Tear Strength, Die C, pli. | 370 | D 624–54 |

Example III

In a manner essentially identical as described in Example II, 525 grams of Polyester C (Example II) were reacted with 175 grams of "Desmophen" 2001 copolymer of adipic acid, ethylene glycol and 1,4butanediol, molecular weight approximately 2,000) at 260°–265° C. in the presence of 10 parts per million of stannous octoate catalyst. The following results were observed:

| Hours at 260–265° C. | Melting Point, °C. |
|---|---|
| 0 | 44–45 |
| 1 | 42–43 |
| 3 | 38–39 |
| 5 | 34–35 |
| 10.5 | 32–33 |

The materials were further heated for 12 hours at 180° C., whereupon the resulting copolyesterdiol was shown to have a melting point of 32°–33° C. The product was shown to have a viscosity of 2,800 centipoises at 35° C., a hydroxyl number of 45.03, and an acid number of 2.66.

Upon reaction of this product with 4, 4'-diphenylmethane diisocyanate and 1,4-butanediol, a strong, resilient and abrasion-resistant urethane elastomer was prepared.

EXAMPLE IV

This example demonstrates the manufacture of a polyether-polyester block copolymer in admixture with a polyester as obtained by reacting a linear hydroxyl-terminated polyether with a linear hydroxyl-terminated polyester.

In the manner described in Example II there were reacted 350 grams of polypropylene glycol 1025 (OH-No. = 110.4) and 350 grams of "Niax" Polyol D-560 (OH-No. = 55.10, acid number = 0.48) in the presence of 20 parts per million of stannous octoate catalyst. D-560 is a poly-epsilon caprolactonediol. The materials were heated at 220°–230° C. The following results were observed:

| Hours at 220–230° C. | Melting Point, °C. |
|---|---|
| 0 | 46–47 |
| 5 | 45–46 |
| 20 | 41–42 |
| 28 | 41–42 |

The resulting blend of polyether-polyester block copolymer and polyester had a hydroxyl number of 76.6 and an acid number of 0.36. The product is admirably suited for the synthesis of urethane elastomers.

The invention has been described hereinabove with reference to certain preferred embodiments thereof. However, it is to be understood that the invention is not to be limited thereto as obvious modifications thereof will be apparent to those skilled in the art.

What is claimed is:

1. Equilibrated copolyesterpolyols manufactured by a process which comprises heating a polyol mixture comprising at least two high molecular weight polyols which have molecular weights ranging from about 500 to about 5,000, at least one of said high molecular polyols being a polyesterpolyol; to a temperature of about 150° C. to about 300+ C.; for a period of time sufficient to produce an equilibrated copolyesterpolyol product having a substantially constant melting point.

2. The equilibrated copolyesterpolyols of claim 1 wherein the high molecular weight polyesterpolyol is prepared via the reaction of lactones and polyols.

3. The equilibrated copolyesterpolyols of claim 1 wherein at least one of said high molecular weight polyols is a polyether polyol.

4. The equilibrated copolyesterpolyols of claim 1 wherein said process is carried out in the presence of an ester interchange catalyst.

5. The process for manufacturing equilibrated copolyesterpolyols which have substantially constant melting points which comprises heating a polyol mixture comprising at least two high molecular weight polyols which have molecular weights ranging from about 500 to about 5,000, at least one of said high molecular polyols being a polyesterpolyol; to a temperature of about 150° C. to about 300° C.; for a period of time sufficient to produce said equilibrated copolyesterpolyols.

6. The process of claim 5 wherein the high molecular weight polyesterpolyol is prepared via the reaction of lactones and polyols.

7. The equilibrated copolyesterpolyols of claim 5 wherein at least one of said high molecular weight polyols is a polyether polyol.

8. The process of claim 5 wherein the reaction is carried out in the presence of an ester interchange catalyst.

9. Polyurethane products prepared by the reaction of the equilibrated copolyesterpolyols of claim 1 with an organic polyisocyanate.

10. Polyurethane products prepared according to claim 9 wherein the organic polyisocyanate is of the group consisting of 2,4-and 2,6-toluene diisocyanates, 4,4'-diphenylmethane diisocyanate, 1,5-naphthalene diisocyanate, 4,4-biphenylene diisocyanate, 3,3'-dimethyl-4,4'-biphenylene diisocyanate, meta-xylylene diisocyanate, and hexamethylene diisocyanate.

11. Polyurethane products prepared according to claim 9 wherein the reaction is effected with a chain extender of the group consisting of water, glycols, amino alcohols, and diamines.

* * * * *